(12) United States Patent
Cunniff et al.

(10) Patent No.: US 8,073,753 B2
(45) Date of Patent: *Dec. 6, 2011

(54) SYSTEM AND METHOD FOR PROVIDING A PACKAGING RECOMMENDATION TO A SHIPPING CUSTOMER

(75) Inventors: Shawn Cunniff, Sandy Springs, GA (US); Michael Pendowski, Alpharetta, GA (US); Susan Landstrom, Alpharetta, GA (US); Patrick McDavid, Warrenville, IL (US); Kimberly Brebner, Alpharetta, GA (US)

(73) Assignee: United Parcel Service of America, Inc.

( * ) Notice: Subject to any disclaimer, the term of this patent is extended or adjusted under 35 U.S.C. 154(b) by 189 days.

This patent is subject to a terminal disclaimer.

(21) Appl. No.: 12/104,860

(22) Filed: Apr. 17, 2008

(65) Prior Publication Data

US 2009/0265179 A1  Oct. 22, 2009

(51) Int. Cl.
*G06Q 40/00* (2006.01)
(52) U.S. Cl. .............. 705/35; 705/36; 705/39; 705/40; 705/44
(58) Field of Classification Search .............. 705/35–45
See application file for complete search history.

(56) References Cited

U.S. PATENT DOCUMENTS

| | | | |
|---|---|---|---|
| 4,153,159 A | 5/1979 | Smith, Jr. | |
| 4,197,914 A | 4/1980 | Grey | |
| 5,027,578 A | 7/1991 | Natterer et al. | |
| 5,711,138 A | 1/1998 | Yamamoto | |
| 5,884,456 A | 3/1999 | Hansen | |
| 5,888,838 A | 3/1999 | Mendelson et al. | |
| 5,971,587 A | 10/1999 | Kato et al. | |
| 6,862,543 B1 | 3/2005 | Tanimoto et al. | |
| 7,062,395 B2 | 6/2006 | Tanimoto et al. | |
| 7,207,485 B2 | 4/2007 | Silverbrook et al. | |
| 7,229,849 B2 | 6/2007 | Kang | |
| 7,234,597 B2 | 6/2007 | Rowe et al. | |
| 7,313,460 B1 | 12/2007 | Prater et al. | |
| 7,751,929 B1 | 7/2010 | Prater et al. | |
| 2003/0105704 A1* | 6/2003 | Sundel | 705/37 |
| 2003/0140701 A1 | 7/2003 | O'Brien et al. | |
| 2003/0200111 A1* | 10/2003 | Damji | 705/1 |
| 2003/0222784 A1 | 12/2003 | Nurse et al. | |

(Continued)

OTHER PUBLICATIONS

"FedEx Ship Manager Software Downloads", "http://www.fedex.com/us/software/downloads.html", 4 pages, dated Mar. 11, 2008.*

(Continued)

*Primary Examiner* — Ella Colbert
*Assistant Examiner* — Hai Tran
(74) *Attorney, Agent, or Firm* — Alston & Bird LLP

(57) ABSTRACT

A system and method for providing a packaging recommendation to a customer is disclosed. The system presents the customer with a merchandise list of merchandise, receives merchandise information from the customer about the particular characteristics of the merchandise, and generates a packaging recommendation via an interface to the customer. This merchandise information includes the type of merchandise being shipped by the customer to a definition, and may include any other information useful in generating the packaging recommendation. After referencing a packaging requirements matrix, the system presents the customer with a packaging recommendation via an interface. The packaging requirements may be easily modified by a system administrator without interrupting the operation of the system. The customer may also define particular merchandise to obtain a packaging recommendation in the event the merchandise is not included in the merchandise list.

11 Claims, 11 Drawing Sheets

U.S. PATENT DOCUMENTS

| | | | |
|---|---|---|---|
| 2004/0260512 | A1 | 12/2004 | Olsson |
| 2005/0049835 | A1 | 3/2005 | Mayer et al. |
| 2005/0055258 | A1 | 3/2005 | Myrick et al. |
| 2005/0072234 | A1 | 4/2005 | Zhu et al. |
| 2005/0075802 | A1 | 4/2005 | Tanimoto et al. |
| 2005/0122524 | A1 | 6/2005 | Ibarra et al. |
| 2005/0125119 | A1 | 6/2005 | Srack et al. |
| 2005/0137912 | A1 | 6/2005 | Rao et al. |
| 2006/0106549 | A1 | 5/2006 | Olsson |
| 2007/0045413 | A1 | 3/2007 | Patrick |
| 2007/0087088 | A1 | 4/2007 | Bellman et al. |
| 2007/0095022 | A1 | 5/2007 | Nissen |
| 2009/0083078 | A1 | 3/2009 | Landstrom et al. |

OTHER PUBLICATIONS

Non-Final Office Action U.S. Appl. No. 11/861,035 dated May 19, 2009.
Final Office Action U.S. Appl. No. 11/861,035 dated Aug. 25, 2009.
Non-Final Office Action U.S. Appl. No. 11/861,035 dated Jan. 5, 2010.
Final Office Action U.S. Appl. No. 11/861,035 dated Jun. 15, 2010.
Non-Final Office Action U.S. Appl. No. 11/861,035 dated Oct. 15, 2010.
Final Office Action U.S. Appl. No. 11/861,035 dated Mar. 30, 2011.
http://www.quantum.com/ServiceandSupport/Index.aspx.
http://www.tc.gc.ca/CivilAviation/commerce/.
http://ehs.ucsc.edu/lab_research_safety/pubs/bio/Non-Infectious-ShippingGuidelines.htm.
http://www.finds.org.uk/conservation/note3.php.
http://www.trademe.co.nz/Help/Topic.aspx?help_id=490&skid=postage&crm_subject_id=&crm_subject_path=.
http://fedex.com/us/solutions/fsm/shippingadministration.html.
http://www.fedex.com/us/developer/index.html.
http://www.usps.com/business/shippingtools/.
http: www.fedex.com/us/solutions/fsm/shippingadministration.html.
http: www.fedex.com/us/software/downloads.html.
http: www.fedex.com/us/customersupport/express/faq.
http: www.fedex.com/business/shipping tools, Mar. 11, 2008.
http: www.usps.com/all/mailingandshippingguidelines/welcome.htm, Mar. 11, 2008.
http: www.fedex.com/us/developer/index.html, Mar. 11, 2008.
Notice of Allowance from U.S. Appl. No. 11/861,035 dated Sep. 9, 2011.

\* cited by examiner

Fig. 5

| Fragility Class | Exterior Packaging (501) | | | | | | Internal Packaging (503) | | | | | | Closure (504) | | | Product Placement Description (505) | | |
|---|---|---|---|---|---|---|---|---|---|---|---|---|---|---|---|---|---|---|
| | UPS Packaging | | Corrugated Shipping Containers | | | | Air Bags | Bubble Sheeting | | Foam in Bag | Loose Fill | Amount | Poly Tape | Tape | | Product vs Product | Product vs Carton | Fragile vs Hard Obj |
| | Envelope | Pak | Single Wall | | Double Wall | | | Small Cell | Amount | | | | Single | Multiple | Paper Tape | | | |
| | | | 32 ECT | 40 ECT | 48 ECT | 200 Burst | | | | | | | | | | | | |
| Response | 4 | 6 | 1 | 2 | 9 | 14 | 19 | 2 | 1 | 25 | | 10 | 1 | 2 | 5 | 1 | 2 | 3 |
| Rugged | | | | | | | | | | | | | | | | | | |
| 0.1 - 5.0 | X | | | | | | | | | | | | | | | | | |
| 5.1 - 10.0 | | X | X | X | X | X | X | X | <1" | X | X | >1" | X | X | X | X | X | X |
| 10.1 - 20.0 | | | X | X | X | X | X | X | <1" | X | X | >1" | X | X | X | X | X | X |
| 20.1 - 30.0 | | | X | X | X | X | | X | <1" | X | | | X | X | | X | X | X |
| Semi-Rugged | | | | | | | | | | | | | | | | | | |
| 0.1 - 5.0 | X | X | | | | | | | | | | | | | | | | |
| 5.1 - 10.0 | | | X | X | X | X | X | X | <1" | X | X | >1" | X | X | X | X | X | X |
| 10.1 - 20.0 | | | X | X | X | X | X | X | <1" | X | X | >1" | X | X | X | X | X | X |
| 20.1 - 30.0 | | | X | X | X | X | | X | <1" | X | | | X | X | | X | X | X |
| Semi-Delicate | | | | | | | | | | | | | | | | | | |
| 0.1 - 5.0 | X | X | | | | | | | | | | | | | | | | |
| 5.1 - 10.0 | | | X | X | X | X | X | X | <2" | X | X | >2" | X | X | X | | | |
| 10.1 - 20.0 | | | X | X | X | X | X | X | <2" | X | X | >2" | X | X | | | | |
| 20.1 - 30.0 | | | X | X | X | X | X | X | <2" | X | | | X | X | | | | |
| Delicate | | | | | | | | | | | | | | | | | | |
| 0.1 - 5.0 | | | X | X | X | X | | | | X | | | X | X | X | | | |
| 5.1 - 10.0 | | | X | X | X | X | | | | X | | | X | X | X | | | |
| 10.1 - 20.0 | | | X | X | X | X | | | | X | | | X | X | | | | |
| 20.1 - 30.0 | | | X | X | X | X | | | | X | | | X | X | | | | |
| Fragile | | | | | | | | | | | | | | | | | | |
| 0.1 - 5.0 | | | X | X | X | X | | X | <2" | X | | | X | X | X | | | |
| 5.1 - 10.0 | | | X | X | X | X | | | | X | | | X | X | X | | | |
| 10.1 - 20.0 | | | X | X | X | X | | | | X | | | X | X | | | | |
| 20.1 - 30.0 | | | X | X | X | X | | | | X | | | X | X | | | | |

| Shipping | Tracking | Freight | Locations | Support | Business Solutions |

Header

Log-in User ID: [ ] Password: [ ] 🔒 Forgot Password [Register]

Support

> Pre-Shipment
> Shipping
> Tracking
> Delivery/Receiving
> billing & Payments
> International
> Freight Services
> Technology Support
> My UPS Support Tell us about your shipment and we will create a customized list of packaging guidelines. Select view Guidelines to continue.

Select one or more merchandise categories.

☐ Apparel
☐ Appliance Parts
☐ Arts and Crafts
☐ Auto, Motorcycle, Airplane parts
☐ Batteries
☐ Blinds
☐ Building Supplies
☐ Business Paper Products/Books
☐ Candles (with or without glass)
☐ CDs/DVDs
☐ Consumer Electronics
☐ Copy and Computer Paper
☐ Display Cases
☐ Documents/Paperwork
☐ Electronic Accessories
☐ Exercise Equipment
☐ Food - Bags/Boxes
☐ Food - Bottles (Plastic)
☐ Food - Cans/Pails (Metal)
☐ Food - Cans/Pails (Plastic)
☐ Food - Glass
☐ Food - Other
☐ Framed Items
☐ Furniture ☐ Home Decor (Non-breakable)
☐ Houseware (Breakable)
☐ Houseware (Non-breakable)
☐ Jewelry
☐ Jewelry and Storage Boxes/Cases
☐ Lab or Medical Equipment
☐ Lawn and Garden Equipment
☐ Lighting
☐ Liquard - bottles (Plastic)
☐ Liquard - Cans/Pails (Metal)
☐ Liquard - Cans/Pails (Plastic)
☐ Liquard - Other
☐ Live Animals
☐ Live Plants
☐ Long Rods
☐ Magazine/Catagories
☐ Musical Instruments
☐ Office Supplies
☐ Packaging/Paper/Plastic Products
☐ Pet Care
☐ Pharmaceutical/Medical
☐ Power and Hardware Tools
☐ Samples
☐ Sporting Equipment Match Line to Fig. 6B Match Line to Fig. 6A ☐ Hardware and Bulk Items    ☐ Toys and Hobby
☐ Hats                        ☐ TVs
☐ Health and Beauty           ☐ Wallpaper
☐ Heating/Cooling             ☐ Windows
☐ Home Decor (Breakable)      ☐ Windshields Do you have merchandise that does not fit any of the categories above? Select Add My Own if you need to enter additional merchandise descriptions and details.

⊞ Add My Own

Enter the combined length, width, height , and aggregate weight

Length:  ×  Width:  ×  Height:  Inches

Weight: _____ lbs.

Footer

View Guidelines >

Header

| Shipping | Tracking | Freight | Locations | Support | Business Solutions |

Support | Log-in User ID: [ ] Password: [ ] ⇪ Forgot Password [Register]

Support
>Pre-Shipment
>Shipping
>Tracking
>Delivery/Receiving
>Billing & Payments
>International
>Freight Services
>Technology Support
>My UPS Support Tell us about your shipment and we will create a customized list of packaging guidelines. Select view Guidelines to continue.

Select one or more merchandise categories.

☐ Apparel
☐ Appliance Parts
☐ Arts and Crafts
☐ Auto, Motorcycle, Airplan parts
☐ Batteries
☐ Blinds
☐ Building Supplies
☐ Business Paper Products/Books
☐ Candles (with or without glass)
☐ CDs/DVDs
☐ Consumer Electronics
☐ Copy and Computer Paper
☐ Display Cases
☐ Documents/Paperwork
☐ Electronic Accessories
☐ Exercise Equipment
☐ Food - Bags/Boxes
☐ Food - Bottles (Plastic)
☐ Food - Cans/Pails (Metal)
☐ Food - Cans/Pails (Plastic)
☐ Food - Glass
☐ Food - Other
☐ Framed Items
☐ Furniture ☐ Home Decor (Non-breakable)
☐ Houseware (Breakable)
☐ Houseware (Non-breakable)
☐ Jewelry
☐ Jewelry and Storage Boxes/Cases
☐ Lab or Medical Equipment
☐ Lawn and Garden Equipment
☐ Lighting
☐ Liguard - bottles (Plastic)
☐ Liguard - Cans/Pails (Metal)
☐ Liguard - Cans/Pails (Plastic)
☐ Liguard - Other
☐ Live Animals
☐ Live Plants
☐ Long Rods
☐ Magazine/Catagories
☐ Musical Instruments
☐ Office Supplies
☐ Packaging/Paper/Plastic Products
☐ Pet Care
☐ Pharmaceutical/Medical
☐ Power and Hardware Tools
☐ Samples
☐ Sporting Equipment 700
702

Match Line to Fig. 7B

Match Line to Fig. 7A

☐ Hardware and Bulk Items    ☐ Toys and Hobby
☐ Hats    ☐ TVs
☐ Health and Beauty    ☐ Wallpaper
☐ Heating/Cooling    ☐ Windows
☐ Home Decor (Breakable)    ☐ Windshields For merchandise that doesn't fit these categories, please provide additional information. Your report will include special instructions for these items. Select Add to add your information to the table.

Merchandise Description:

[_____] — 712

Merchandise Can Be Damaged By: (Select all that apply)
☐ Compression
☐ Edge Shock
☐ Shock
☐ Vibration
— 704

[ Add ] — 710

| Merchandise Description | Compression | Edge Shock | Shock | Vibration | Remove |
|---|---|---|---|---|---|
| | | | | | |

706

Enter the combined length, width, height, and aggregate weight
Length: [____] x Width: [____] x Height: [____] Inches
Weight: [____] lbs.

< View Guidelines > — 708

Footer

Fig. 7B

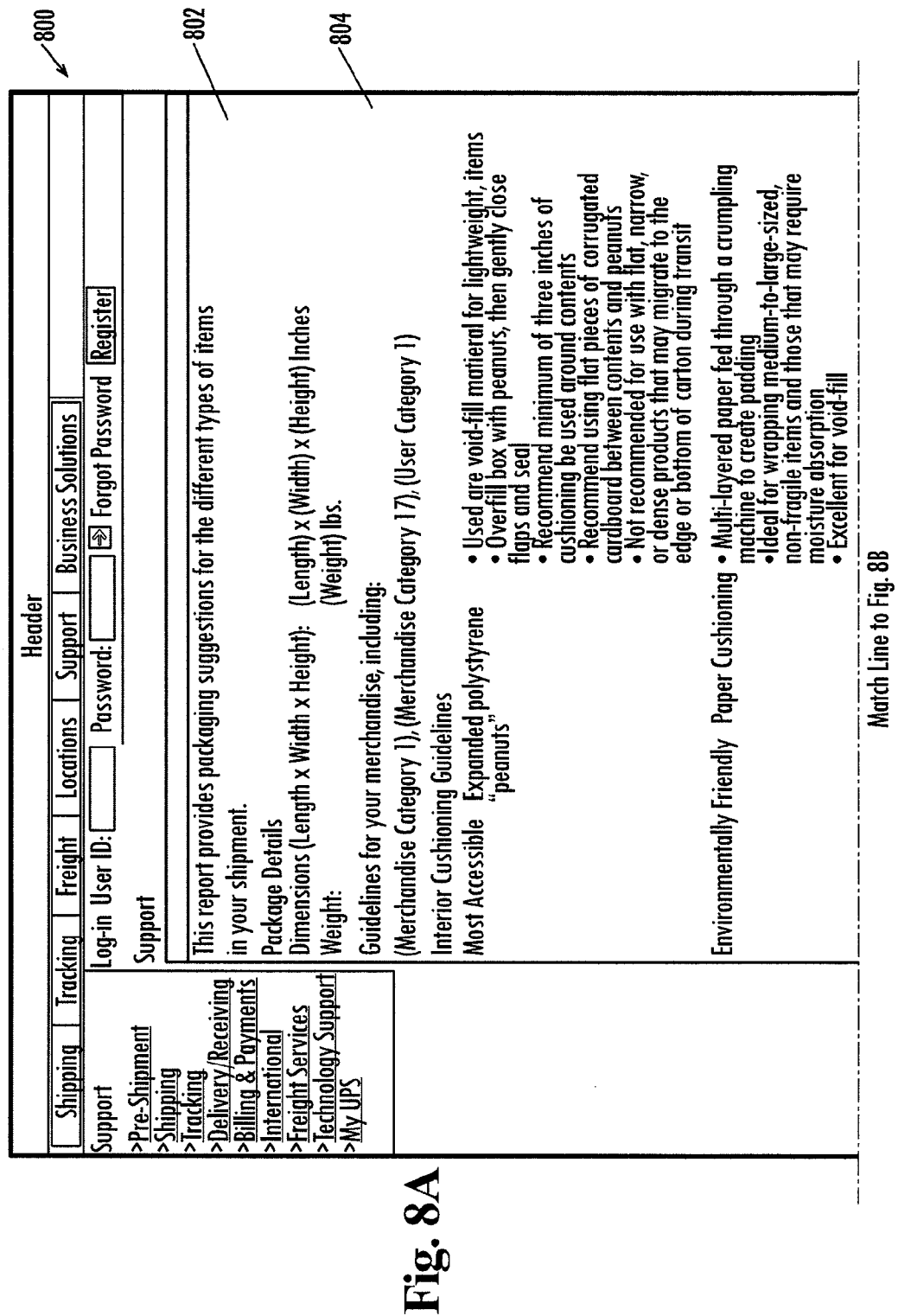

Fig. 8B

Match Line to Fig. 8A

| Best All Around Product | Foam-in-place | • Multi-layered paper fed through a crumpling machine to create padding<br>• Ideal for wrapping medium-to-large-sized, non-fragile items and those that may require moisture absorption<br>• Excellent for void-fill |

— 806
— 808

Product Placement Guidelines
Each of these items should be placed in the box and seperated from each other by the Loose fill Peanuts.

General Guidelines

Exterior Carton Guidelines
Make sure your box has a seal reflecting this number or is an equivalent
Meets Minimum Standards:     32 ECT Box
Additional Protection:       200 Burst Strength
Beat All Around Protection:  276 Burst Strength

Closure Guidelines
Close your box securely by applying three strips of pressure sensitive plastic or nylon reinforced tape to both the top ad bottom of the box so the middle and two edge seams are sealed.

Shipping Label Placement Guidelines
• Place a single shipping label on the top of the shipping container. To avoid confusion, place only one address label on the container.
• If using a packing slip, place it on the same surface as the address label.
• Do not place the label on a seam, edge, or closure or on top of sealing tape.

810 —
812 —
814 —

For more information, you can also visit the following locations:
→ The UPS Store
→ UPS PSI Text Lab ← Edit This Report
← Back to Packaging Guidelines

816 —

Footer

SYSTEM AND METHOD FOR PROVIDING A PACKAGING RECOMMENDATION TO A SHIPPING CUSTOMER

BACKGROUND OF THE INVENTION

For years, the self-service shipping industry has allowed shipping customers to pack packages for shipment to destinations all over the world. Retail stores allow customers to drop off packages including self-packed merchandise, and then select a shipping service for the package. This merchandise may include any number of items, including fragile items such as glassware, artwork, or china, to more robust items, such as clothing, books, or documents. After payment for the shipping service, the package is transported via the shipping carrier to the destination.

Allowing customers to pack their own merchandise, however, has proved problematic in certain situations. Some customers are infrequent shippers, and thus, are not skilled in the area of packaging merchandise. Other customers, such as small businesses, may ship more frequently but may not package the merchandise sufficiently due to time constraints or budget considerations. Regardless of the reason, many times the merchandise within the package may be improperly packaged, and thus, may be susceptible to damage.

The task of educating customers on proper packaging, however, is a task that also proves problematic for shipping carriers. Each particular type of merchandise and final destination may present a different shipping recommendation, prohibiting a generalized tutorial available in a form most customers will take the time to read. Thus, to determine proper packaging for a particular piece of merchandise, a customer may resort to transmitting a question to the shipping carrier by telephone, e-mail, or in person at a retail shipping outlet. These questions, regardless of their form, require manpower or other resources to handle and may result in customer churn if not promptly answered.

Thus, there is a need in the art for a method and system for efficiently educating customers on how to properly package merchandise for shipment to a final destination.

BRIEF SUMMARY OF THE INVENTION

The various embodiments of the present invention solve the aforementioned and other problems in the prior art by providing a method, system, and computer readable medium for providing a customized packaging recommendation to a customer that receives shipment details from the customer about the particular characteristics of the merchandise and shipment, and generates a packaging recommendation via an interface to the customer. One embodiment of the present invention comprises a method for providing a packaging recommendation to a customer for packaging merchandise. The method comprises the steps of querying a customer for shipment details about merchandise to be shipped to a destination; receiving an input including shipment details from the customer; determining minimum packaging requirements for the merchandise; generating a packaging recommendation based on the shipment details; and providing the packaging recommendation to the customer via an interface.

In one embodiment of the method of the present invention, the step of querying the customer for shipment details step comprises presenting the customer with a merchandise list including a plurality of pre-defined merchandise descriptions or allowing the customer to input information about the merchandise if the merchandise does not appear in the merchandise list. Also, in one embodiment of the method of the present invention, the step of determining packaging requirements for the merchandise comprises referencing a packaging requirements matrix which includes information regarding the minimum packaging requirements for a plurality of fragility classes. The packaging matrix may be created by a shipping carrier as the result of numerous tests on various packages, and may be changed at any time by the shipping carrier by changing the values in the matrix.

In one embodiment of the method, the querying step may comprise presenting the customer with a merchandise list including a plurality of pre-defined merchandise descriptions or allowing the customer to define a merchandise description. The step of determining packaging requirements for the merchandise may comprise referencing a packaging requirements matrix. The step of generating a packaging recommendation based on the shipment details may comprise generating an external packaging recommendation and an internal packaging recommendation. In one embodiment of the present invention, providing the packaging recommendation to the customer comprises may comprise presenting the packaging recommendation on a computer monitor, printing the packaging recommendation, or sending the packaging recommendation via electronic mail.

Another embodiment of the present invention comprises a system for providing a packaging recommendation to a customer for packaging merchandise. The system comprises a processing unit; an input/output system; a shipment definition module configured to receive an input via the input/output system from a customer regarding merchandise to be shipped; and a packaging recommendation module configured to reference a packaging requirements matrix to determine the packaging recommendation and present the packaging recommendation to the customer via the input/output system. The input/output system may include a monitor and a printer. The system may also comprise any number of devices or forms, including a stand alone kiosk or a handheld unit. Furthermore, the shipment definition module and packaging recommendation generation module may be components of the packaging recommendation system or stand alone computers.

Yet another embodiment of the present invention comprises a computer-readable storage medium having instructions for causing a computer device to execute a method comprising: querying a customer for shipment details about merchandise to be shipped to a destination; receiving an input including shipment details from the customer; determining minimum packaging requirements for the merchandise; generating a packaging recommendation based on the shipment details; and providing the packaging recommendation to the customer via an interface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is an exemplary packaging requirements matrix for the packaging recommendation module to utilize when generating a packaging recommendation.

FIGS. 6A and 6B show a user interface screen illustrating an exemplary interface for querying a customer for merchandise information in accordance with an embodiment of the present invention.

FIGS. 7A and 7B show a user interface screen illustrating an exemplary interface for querying a customer for merchandise information when the merchandise is not included in the merchandise list in accordance with an embodiment of the present invention.

FIGS. 8A and 8B show user interface screens illustrating exemplary interfaces for presenting the customer the packaging recommendation in accordance with an embodiment of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

The present invention provides a method and system for providing a packaging recommendation to a customer via an interface based on merchandise information received from the customer. In one embodiment of the present invention, a shipment definition module obtains the shipment details needed to generate the packaging recommendation from the customer. The shipment details may include, but is not limited to, the type of merchandise, dimensions of the merchandise, weight of the merchandise, and destination of the merchandise. Once the shipment details are obtained, a packaging recommendation generation module assigns the merchandise to a fragility class, which may involve referencing a table indicating which types of merchandise belong to which fragility class, or receiving an indication of what fragility class to assign the merchandise via the input/output system. The packaging requirements for the fragility class are obtained from a packaging requirements matrix which includes the minimum packaging requirements for each fragility class. The packaging requirements are then assembled into a packaging recommendation and presented to the customer.

Figure 1:
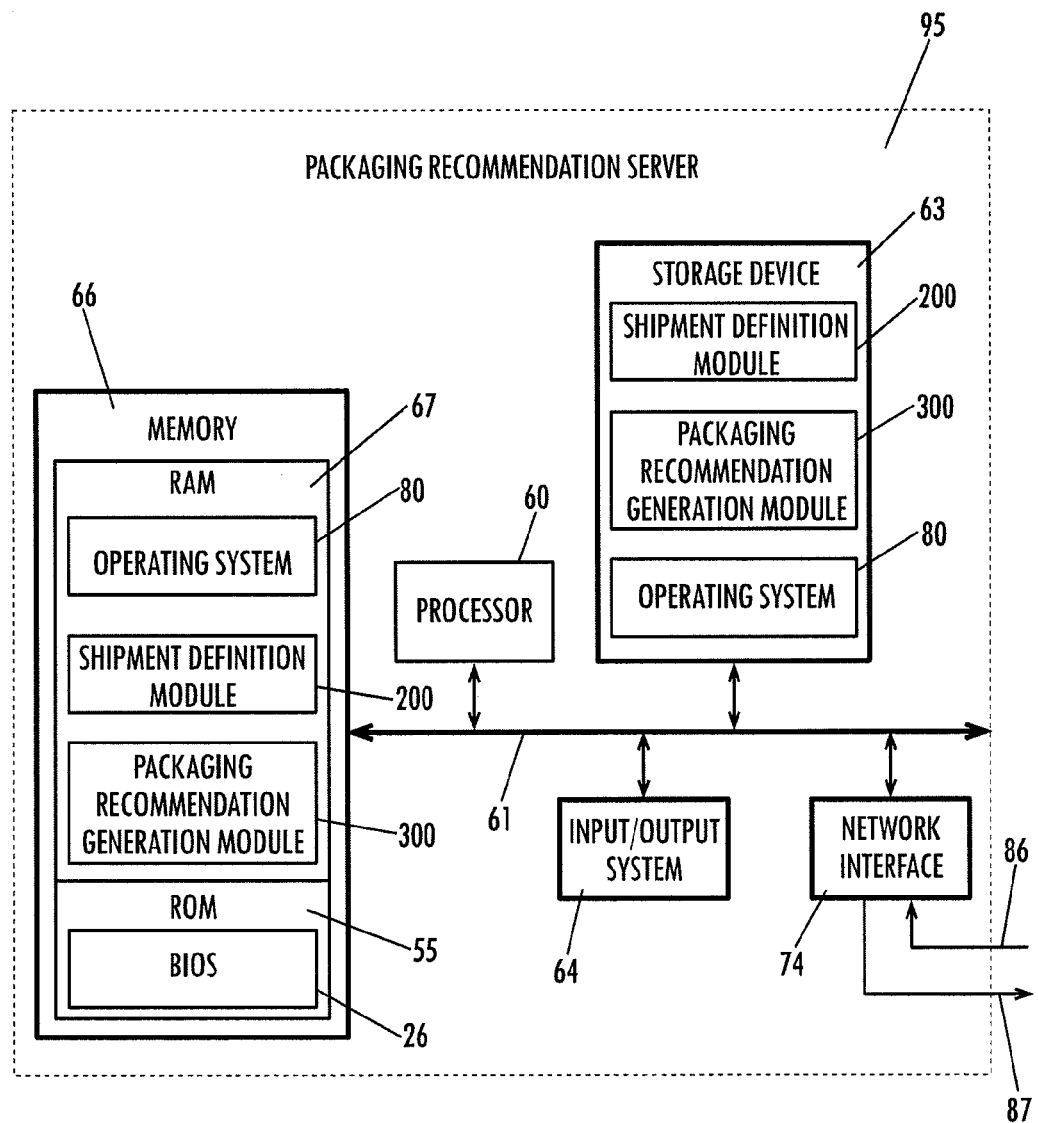
FIG. 1 is a block diagram representing a packaging recommendation server in accordance with the various embodiments of the present invention.

Referring to FIG. 1, the system comprises a packaging recommendation server which includes a processor 60, such as a microprocessor, which is used to execute software instructions for carrying out the defined steps of the method of the various embodiments of the present invention. The processor 60 communicates using a data bus 61 that is used to convey data and program instructions, typically, between the processor and memory 66.

The package recommendation device 50 further includes memory 66, which preferably includes both read only memory (ROM) 65 and random access memory (RAM) 67. In various embodiments, memory 66 can be considered primary memory such as RAM memory or other forms which retain the contents only during operation, or it may be a non-volatile memory, such as ROM, EPROM, EEPROM, FLASH, or other types of memory that retain the memory contents. The memory 66 could also be secondary memory, such as disk storage, that stores a relatively large amount of data. The memory may also comprise any application program interface, system, libraries and any other data by the processor to carry out its functions. ROM 65 is used to store a basic input/output system 26 (BIOS), containing the basic routines that help to transfer information between components of the packaging recommendation server, including the shipment definition module 200, packaging recommendation generation module 300, and the operating system 80.

In some embodiments, the disk storage may communicate with the processor using an I/O bus instead or a dedicated bus. The secondary memory may be a floppy disk, hard disk, compact disk, DVD, or any other type of mass storage type known to those skilled in the computer arts. Also included in the packaging recommendation server 95 is an input/output system 64 for receiving and displaying data. This input/output system 64 may be, for example, a keyboard or pointing device that is used in combination with a monitor.

In addition, the packaging recommendation server 95 includes at least one storage device 63, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the package analysis device 50. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 67. Such program modules include the shipment definition module 80 and packaging recommendation generation module 100. Those skilled in the art will appreciate that other modules may be present in RAM to effectuate the various embodiments of the present invention. Furthermore, rather than program modules, the shipment definition module and packaging recommendation generation module may comprise stand alone computers connectively coupled to the packaging recommendation server 95.

Also located within the packaging recommendation server 95 is a network interface 74, for interfacing and communicating with other elements of a computer network. It will be appreciated by one of ordinary skill in the art that one or more of the components of the packaging recommendation server 95 may be located geographically remotely from its other components. Furthermore, one or more of the components may be combined, and additional components performing functions described herein may be included in the package analysis device 50.

Various information is input by a user to the package analysis device 50 via the network interface 74. This input information 86 may includes shipment details, shipping details, or destination information. This input information may vary, however, depending on the configuration and informational requirements of packaging recommendation server 95.

The packaging recommendation server 95 outputs a packaging recommendation including guidelines for packaging the merchandise input by the customer. This packaging recommendation may comprise any number of forms, including an electronic signal, a graphic or other indicia presented on an interface, a document, or an audible indication. Those skilled in the art will appreciate that this packaging recommendation 96 may take a number of forms within the spirit and scope of the present invention.

Those skilled in the art will recognize that many other alternatives and architectures are possible and can be used to practice various embodiments of the invention. The embodiments illustrated in FIG. 1 can be modified in different ways or incorporated within a network and be within the scope of the invention. Such a network, which may incorporate the packaging recommendation server 95, is shown in FIG. 2.

Figure 2:
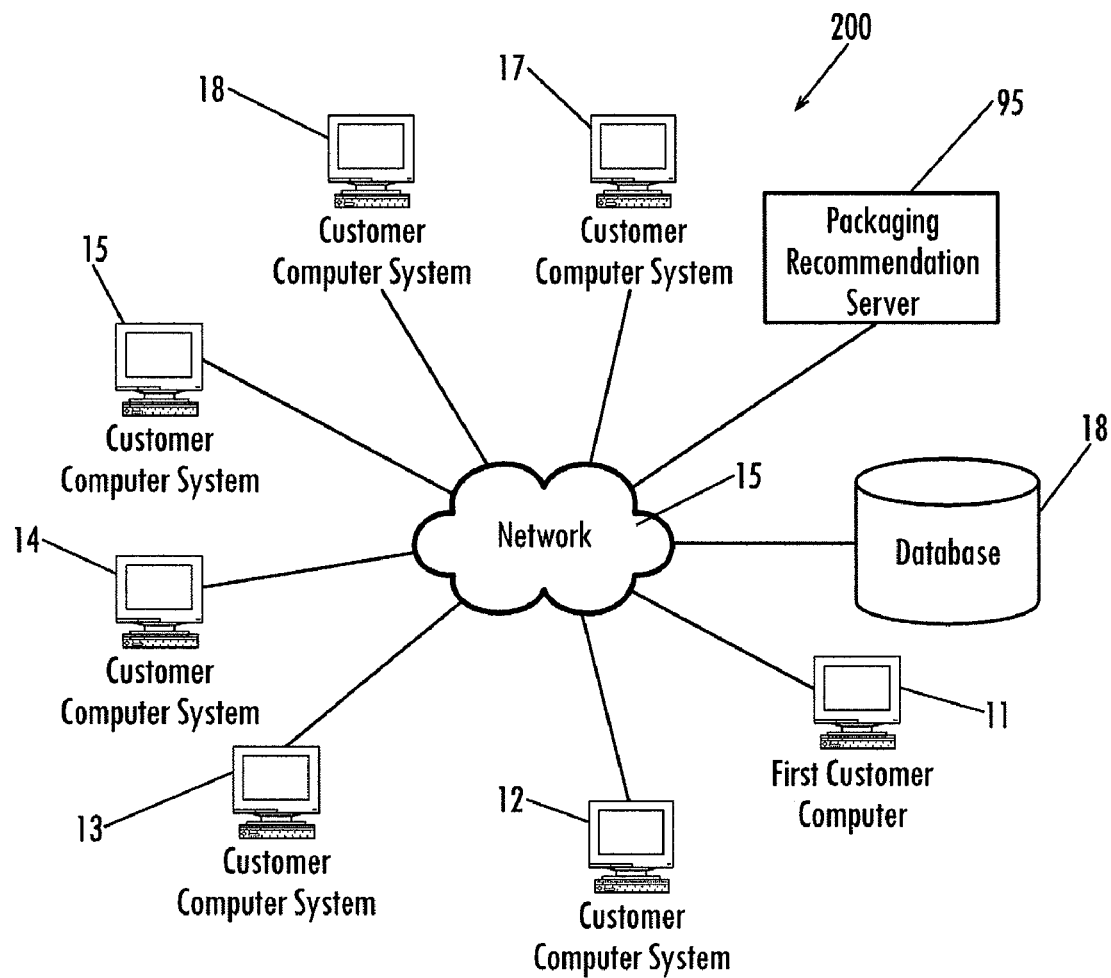
FIG. 2 is a system diagram illustrating a network environment for operating the packaging recommendation server in accordance with an embodiment of the present invention.

As may be understood from FIG. 2, in this embodiment, the system 200 includes one or more customer computers 11-17, including first customer computer 12, that are connected, via a network 15 (e.g., a LAN or the Internet), to communicate with the packaging recommendation server 95. In one embodiment of the invention, the packaging recommendation server 95 is configured for retrieving data from, and storing data to, a database 18 that may be stored on (or, alternatively, stored remotely from) the packaging recommendation server 95.

Shipment Definition Module

Figure 3:
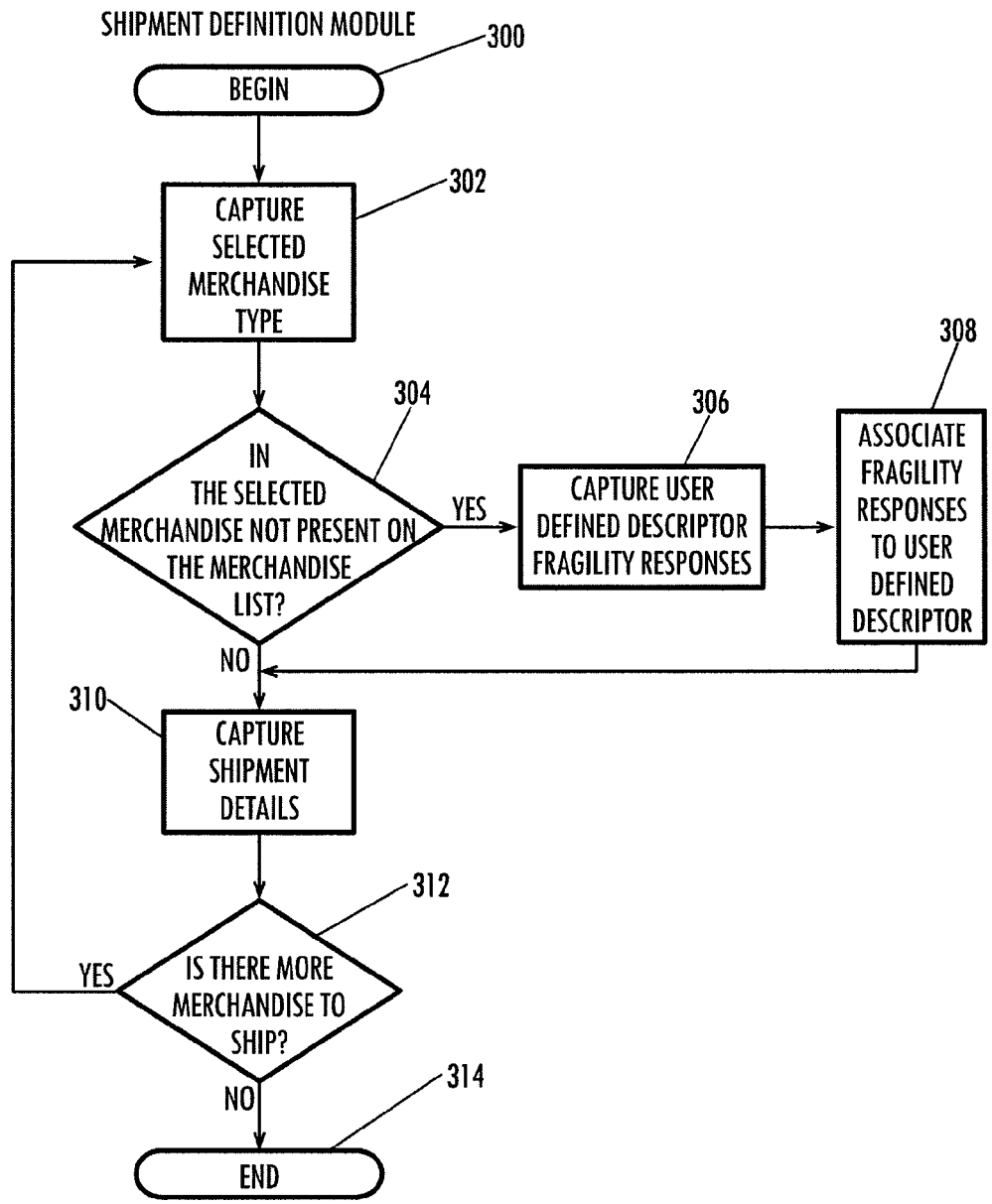
FIG. 3 is a flow diagram illustrating the operation of the shipment definition module in accordance with an embodiment of the present invention.

FIG. 3 is a flow diagram illustrating the operation of the shipment definition module in accordance with an embodiment of the present invention. The flow diagram shown in FIG. 3 may include processing performed by processor 60 as it generates the shipment definition module 200. The shipment definition module begins at step 300, which may involve a customer navigating to a particular webpage on a shipping carrier website, walking into a shipping carrier retail outlet and initiating a session on a kiosk operating the present invention, or any other method of interacting with a system operating the present invention.

After the shipment definition module begins at step 300, the shipment definition module proceeds to capture the selected merchandise at step 302. Merchandise may be selected by presenting the customer with a merchandise list including one or more pre-defined merchandise descriptions via a graphical user interface presented on an input/output system 64 on a first customer computer 12 connectively coupled to a packaging recommendation server 95 via a network 15.

The shipment definition module determines at step 304 if the customer has indicated that the merchandise to be shipped is not present in the merchandise list, which may occur by a customer selecting an "other" category provided on an user interface. If the customer has indicated that merchandise to be shipped is not present in the merchandise list, the shipment definition module proceeds to step 306 and captures the user defined descriptor and fragility responses. These fragility responses may include answers to questions presented to the user about the susceptibility of the merchandise from damage from shock, edge shock, compression, and vibration. Those skilled in the art will appreciate that other questions may be presented to the user related to fragility that are not listed here. The user defined descriptor and fragility responses may be captured via the input/output system 64 or an input/output system operating on a customer computer, and may include a keyboard, mouse, monitor, or other input/output equipment.

Once the user defined descriptor and fragility responses are captured at step 306, the shipment definition module associates the fragility responses with the user-defined descriptor. This association may enable the customer to select the user-defined descriptor in the future in the event the customer ships the type of merchandise associated with user-defined descriptor again. The shipment definition module then proceeds to step 310.

The shipment definition module proceeds directly to step 310 from step 304 if the customer indicates that the merchandise to be shipped is in the merchandise list. This may comprise the customer selecting a merchandise type in the merchandise list rather than selecting an "other" or "not listed" option. At step 310, the shipment definition module captures the combined dimensions of the merchandise to be shipped and the aggregate weight of the merchandise. The combined dimensions and aggregate weight may be captured any number of ways in combination with the input/output system 64 of the packaging recommendation server 95, including but not limited to, receiving an input via a keyboard or mouse. The combined dimensions and aggregate weight may also be captured via an input/output system 64 at a customer computer communicatively coupled to packaging recommendation server 95 via network 15.

Packaging Recommendation Generation Module

Figure 4:
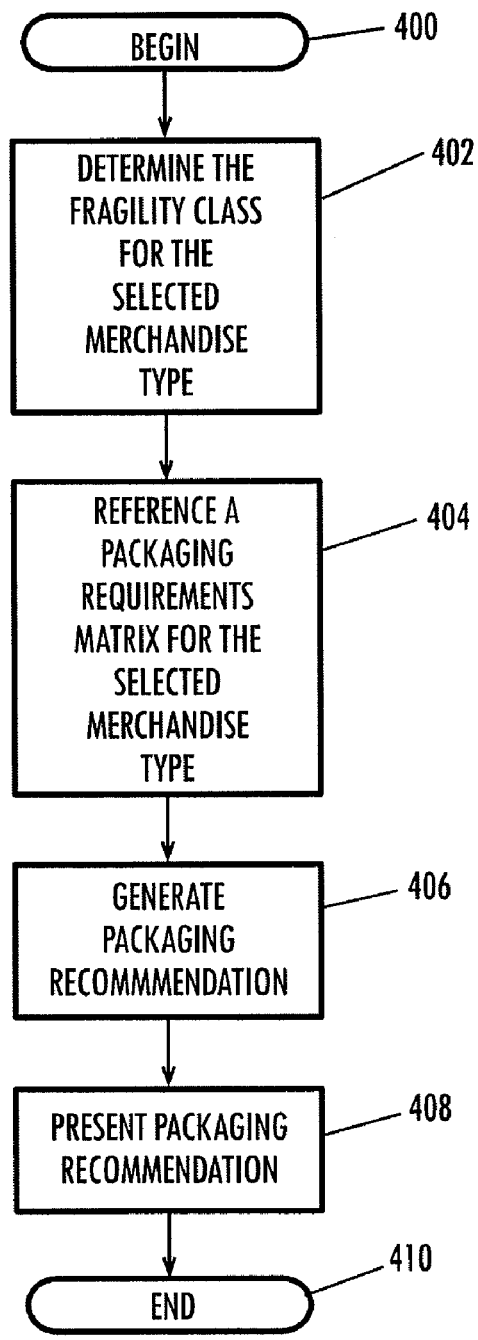
FIG. 4 is flow diagram illustrating the operation of the packaging recommendation generation module in accordance with an embodiment of the present invention.

FIG. 4 is flow diagram illustrating the operation of the packaging recommendation generation module in accordance with an embodiment of the present invention. The processing of FIG. 4 may be performed by the processor 60 as it executes the packaging guidelines generated by module 300. The processing performed by the packaging recommendation generation module begins at step 400 and proceeds to determine the number of unique fragility classes applicable to the selected merchandise. Fragility classes may comprise any defined group of merchandise having common fragility characteristics, including scaled numerical ratings indicative of the fragility of the merchandise.

The packaging recommendation generation module proceeds to step 404 and groups the merchandise into one or more fragility classes. This step may involve not only grouping selected merchandise into the one or more fragility classes, but also grouping un-selected merchandise into one or more fragility classes, i.e., merchandise associated with user-defined descriptors.

Once the packaging recommendation generation module has grouped the merchandise, both selected and un-selected, into fragility classes, the packaging recommendation module selects the "most fragile" merchandise, in the event more than one piece of merchandise is being shipped. The packaging recommendation generation module then generates the packaging recommendation at step 406, which involves generating the packaging recommendation for the selected "most fragile" piece of merchandise in the event more than one piece of merchandise is being shipped. Generating the packaging recommendation involves generating interior cushioning and product placement guidelines for each fragility class, which may include referencing a packaging requirements matrix including this information. This step may also involve generating exterior packaging and closure guidelines for the aggregate weight, and generating labeling guidelines.

Once the packaging recommendation generation module has generated the packaging recommendation, the packaging recommendation is presented to the customer at step 408. The interior cushioning and product placement guidelines set for each associated merchandise category selected and merchandise descriptor is displayed. The exterior packaging closure, labeling guidelines, as well as user specified data, is also displayed. Rather than displaying the data, or in addition to displaying the data, the packaging recommendation may be presented to the customer in other ways, including but not limited to, printing or emailing the packaging recommendation.

FIG. 5 is an exemplary packaging requirements matrix for the packaging recommendation module to utilize when generating a packaging recommendation. Packaging requirements matrix 500 includes a fragility column listing fragility classes including rugged and semi-rugged, further divided into sub-classes based on the weight of the merchandise. The columns following the fragility column lists different types of packaging. The row associated with the appropriate fragility class will be populated with values indicating the recommended packaging for that fragility class. This information may be changed by a system administrator by changing the values in the packaging requirements matrix. Those skilled in the art will appreciate that the packaging requirements matrix 500 is shown for exemplary purposes only, and the content of the packaging requirements matrix 500 may have different information than shown while staying in the spirit and scope of the present invention.

User Interfaces

FIGS. 6A and 6B show a user interface screen illustrating an exemplary interface for querying a customer for merchandise information in accordance with an embodiment of the present invention. As shown in screen shot 600, the customer is presented with merchandise list 602 which includes a plurality of merchandise types. A customer may select the applicable merchandise type by selecting the radio button adjacent to the applicable merchandise type.

If an applicable merchandise type is not listed, the customer may select the "add my own" option at 604, which is described in further detail in the discussion for FIGS. 6A and 6B. The user is prompted to enter dimensions for the merchandise at 606, and may then select to "view guidelines" at 608.

If the user selects the "add my own" option at 604 (or another indicator for an "other" category), the screen expands to the exemplary screen shot 700 shown in FIGS. 7A and 7B. At 702, the user is prompted to enter information relating to the merchandise, including a "merchandise description" which is the user-defined descriptor for the merchandise. The customer is also prompted at 704 to input whether the merchandise may be damaged by compression, edge shock, shock, and vibration. If the merchandise can be possibly damaged by any of those events, the customer may click the radio button to the left of the applicable description. The customer may also select any of the named events to obtain a description of the event. Once these fields are populated, the customer my select the "add" button 706 to select the merchandise associated with the user-defined descriptor.

Exemplary screen 700, like exemplary screen 600, includes a merchandise list 602, a field 606 for inputting the dimensions of the package, including length, width, height, and weight. As with the exemplary screen 600, once the dimensions are entered, the user may select "view guidelines" 608 to obtain the packaging recommendation.

FIGS. 8A and 8B are user interface screens illustrating exemplary interfaces for presenting the customer the packaging recommendation in accordance with an embodiment of the present invention. As shown in exemplary screen shot 800, the packaging recommendation is presented in a form viewable on a computer monitor, and includes packaging details 802, interior cushioning guidelines 804, product placement guidelines 806, and general guidelines 808. The general guidelines 808 may include exterior carton guidelines 810, closure guidelines 812, and shipping label placement guidelines 814. The customer may also be presented with one or more links to relevant websites 816, including the website for a retail shipping merchant.

FIG. 8 shows an exemplary user interface which may be used when more than one type of merchandise is being shipped. As shown in exemplary screen shot 800, two interior packaging recommendations are presented, a first packaging recommendation 802 and a second packaging recommendation 804. The customer is also presented with general information 806 and related information 810. Those skilled in the art will appreciate that these exemplary user interfaces are shown by way of example only, and deviations may be made to the manner in which the packaging recommendation is presented to the customer within the spirit and scope of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing a packaging recommendation for packaging merchandise, said method comprising the steps of:
receiving, via one or more processors, input of a user-defined merchandise description;
electronically storing the user-defined merchandise description as a user-defined merchandise type;
electronically storing the user-defined merchandise type in association with one or more fragility classes;
generating, via the one or more processors, a request for shipment details about merchandise to be shipped to a destination, wherein (a) generating the request for shipment details further comprises causing display of a plurality of selectable merchandise types comprising the user-defined merchandise type and pre-defined merchandise types and (b) each of the plurality of selectable merchandise types is used to identify one or more fragility classes;
in response to generating a request for shipment details about the merchandise, receiving, via the one or more processors, input (a) selecting one of the plurality of selectable merchandise types and (b) providing shipment details about the merchandise, wherein the shipment details comprise (i) merchandise dimensions and (ii) a merchandise weight;
electronically identifying a fragility class associated with the merchandise based at least in part on the selected merchandise type;
electronically identifying minimum packaging requirements for the merchandise based at least in part on the fragility class;
generating, via the one or more processors, a packaging recommendation based at least in part on the shipment details and minimum packaging requirements; and
causing display of the packaging recommendation.

2. The method of claim 1, wherein the minimum packaging requirements are stored in a packaging requirements matrix.

3. The method of claim 1, wherein the packaging recommendation comprises an external packaging recommendation and an internal packaging recommendation.

4. The method of claim 3, wherein the internal packaging recommendation comprises interior cushioning and product placement guidelines.

5. The method of claim 3, wherein the external packaging recommendation comprises packaging closure and labeling guidelines.

6. A computer program product for providing a packaging recommendation for packaging merchandise, the computer program product comprising at least one computer-readable storage medium having computer-readable program code portions stored therein, the computer-readable program code portions comprising:
- an executable portion configured to receive input of a user-defined merchandise description;
- an executable portion configured to store the user-defined merchandise description as a user-defined merchandise type;
- an executable portion configured to store the user-defined merchandise type in association with one or more fragility classes;
- an executable portion configured to generate a request for shipment details about merchandise to be shipped to a destination, wherein (a) generating the request for shipment details further comprises causing display of a plurality selectable merchandise types comprising the user-defined merchandise type and pre-defined merchandise types and (b) each of the plurality of selectable merchandise types is used to identify one or more fragility classes;
- an executable portion configured to, in response to generating a request for shipment details about the merchandise, receive input (a) selecting one of the plurality of selectable merchandise types and (b) providing shipment details about the merchandise, wherein the shipment details comprise (i) merchandise dimensions and (ii) a merchandise weight;
- an executable portion configured to identify a fragility class associated with the merchandise based at least in part on the selected merchandise type;
- an executable portion configured to identify minimum packaging requirements for the merchandise based at least in part on the fragility class;
- an executable portion configured to generate a packaging recommendation based on the shipment details and minimum packaging requirements; and
- an executable portion configured to cause display of the packaging recommendation.

7. The computer program product of claim 6, wherein the minimum packaging requirements are stored in a packaging requirements matrix.

8. The computer program product of claim 6, wherein the packaging recommendation comprises an external packaging recommendation and an internal packaging recommendation.

9. The computer program product of claim 8, wherein the internal packaging recommendation comprises interior cushioning and product placement guidelines.

10. The computer program product of claim 8, wherein the external packaging recommendation comprises packaging closure and labeling guidelines.

11. The computer program product of claim 6, wherein said providing step comprises sending the packaging recommendation via electronic mail.

* * * * *